United States Patent [19]

Silberberg et al.

[11] Patent Number: 4,856,860
[45] Date of Patent: Aug. 15, 1989

[54] INTEGRATED ALL-OPTICAL SWITCHING DEVICES

[75] Inventors: Yaron Silberberg, Princeton Township, Mercer County; Peter W. Smith, Colts Neck Township, Monmouth County, both of N.J.

[73] Assignee: Bell Communications Research, Inc., Livingston, N.J.

[21] Appl. No.: 199,169

[22] Filed: May 26, 1988

[51] Int. Cl.$^4$ ............................................... G02B 6/10
[52] U.S. Cl. .............................. 350/96.12; 350/96.15; 350/96.34
[58] Field of Search ............... 350/96.12, 96.13, 96.14, 350/96.15, 96.29, 96.34; 307/425–430

[56] References Cited

U.S. PATENT DOCUMENTS

| | | | |
|---|---|---|---|
| 4,262,995 | 4/1981 | Tangonan | 350/96.12 X |
| 4,497,535 | 2/1985 | Winful et al. | 350/96.12 |
| 4,583,818 | 4/1986 | Chen et al. | 350/96.12 X |
| 4,603,420 | 7/1986 | Nishizawa et al. | 372/45 |
| 4,626,075 | 12/1986 | Chemla | 350/96.14 X |

OTHER PUBLICATIONS

"Optical Bistability Based on Self-Focusing", by J. E. Bjorkholm et al, Optics Letters, vol. 6, No. 7, Jul. 1981, pp. 345–347.
"Optical Bistability", edited by C. M. Bowden et al, Plenum Publishing Corp., pp. 463, 477–478 (1981).
"First Observation of Higher-Order Planar Soliton Beams", by S. Maneuf et al, Proceedings of the International Commission for Optics, Quebec, Canada, 14 (1987), Paper A11.2, pp. 385–386.
"Short Laser Pulses; Optical Applications", by C. Froehly, *Proceedings of the International Commission for Optics*, Quebec, Canada, 14 (1987), Paper A11.1, pp. 381–384.
"Soliton Beam Self Trapping Applied to Passive Mode Locking of Lasers", by Barthelemy et al, *Proceedings of the International Commission for Optics*, Quebec, Canada, 14 (1987), Paper A11.3, pp. 387–388.

*Primary Examiner*—John D. Lee
*Attorney, Agent, or Firm*—James W. Falk

[57] ABSTRACT

Two-dimensional all-optical devices include a planar single-mode waveguide formed on or in a major surface of a supporting substrate. The waveguide comprises a nonlinear medium having an intensity-dependent index of refraction. For input optical signals above a critical intensity, self-focusing occurs in the waveguide. Microminiature high-speed bistable and switching devices based on this phenomenon and compatible with integrated-optics technology are thereby provided.

3 Claims, 3 Drawing Sheets

INTEGRATED ALL-OPTICAL SWITCHING DEVICES

BACKGROUND OF THE INVENTION

This invention relates to high-speed devices and, more particularly, to all-optical devices suitable for performing functions such as switching, memory and logic in an information processing system.

It is known that self-focusing occurs when a light beam having a non-uniform spatial profile (such as a Gaussian laser beam) and sufficient intensity propagates through a non-linear medium having an intensity-dependent index of refraction. For self-focusing to be possible, the refractive index of the medium must increase with increasing light intensity An all-optical bistable device embodying the concept of self-focusing in three dimensions is described in "Optical Bistability Based on Self-Focusing" by J.E. Bjorkholm et al, Optics Letters, Vol. 6, No. 7, July 1981, pp. 345–347. In the three-dimensional (3D) device of Bjorkholm et al, the non-linear medium consists of sodium vapor contained in a heated glass cell.

Other 3D optical devices based on self-focusing have been proposed. For example, in Optical Bistability, edited by C. M Bowden et al, Plenum Publishing Corp. New York, 1980, P. W. Smith et al describe such a device that includes an elongated waveguide (such as an optical fiber) made of a nonlinear optical material.

Self-focusing optical devices of the 3D type as heretofore described are inherently unstable and typically require a relatively large amount of optical power for operation. Such 3D devices have not therefore been generally regarded as suitable all-optical components for inclusion in a high-speed information processing system.

Recently, the observation and theory of propagating soliton (selffocused-optical) beams in a non-linear planar guides have been described ("First Observation of Higher-Order Planar Soliton Beams" by S. Maneuf et al, *Proceedings of the International Commission for Optics*, Quebec, Canada, 14 (1987), paper A11.2, pp. 385–386). But, heretofore, no practical two-dimensional (2D) optical devices based on such self-focusing have been reported or suggested.

SUMMARY OF THE INVENTION

We recognize that the extension of optical self-focusing to 2D media could provide the basis for realizing practical devices characterized by stability and relatively low-power operation. Further, we recognize that such devices could perform useful logic, memory and switching operations in a planar structure compatible with the technology known as integrated optics.

In accordance with the principles of the present invention, a 2D all-optical device of the self-focused type includes a non-linear medium comprising a planar single-mode waveguide formed on or in a major surface of a supporting substrate. In one embodiment that functions as a bistable device, light is both introduced into and abstracted from one end of the waveguide. A reflective coating is formed on the opposite end of the waveguide. For a low-intensity input light beam, there is essentially no selffocusing in the waveguide. As a result, the input beam diverges appreciably in propagating through the waveguide and relatively little light is reflected back from the reflective coating to appear at the one end of the waveguide as an output beam. On the other hand, a high-intensity input light beam applied to the one end of the waveguide is self-focused in the waveguide and propagates therein essentially as a parallel beam. Consequently, most of the input light is reflected back from the reflective coating and appears at the one end of the waveguide as an output beam. This feedback action reinforces self-focusing in the waveguide and allows the phenomenon to be maintained even when the intensity of the input beam is reduced below the high-intensity value that initiated self-focusing. This mechanism gives rise to the device exhibiting an advantageous optical bistability or hysteresis characteristic.

Another embodiment of the principles of this invention comprises a 2D all-optical switching device based on the phenomenon of self-focusing. In this embodiment, narrow single-mode input and output waveguiding sections are formed on or in a substrate at the respective input and output ends of the device. A planar single-mode waveguide is formed on or in the substrate between the input and output sections. A low-intensity light beam applied to the input section of the device diverges in the planar waveguide and is only weakly coupled to the output section of the device. On the other hand, a high-intensity light beam applied to the input section is self-focused in the planar waveguide and propagates therein towards the output section essentially as a parallel beam. In that case, the input light is efficiently coupled to the output section of the device.

BRIEF DESCRIPTION OF THE DRAWING

A complete understanding of the present invention and of the above and other features and advantages thereof may be gained from a consideration of the following detailed description presented hereinbelow in connection with the accompanying drawing, not drawn to scale, in which.

DETAILED DESCRIPTION

Figure 1:
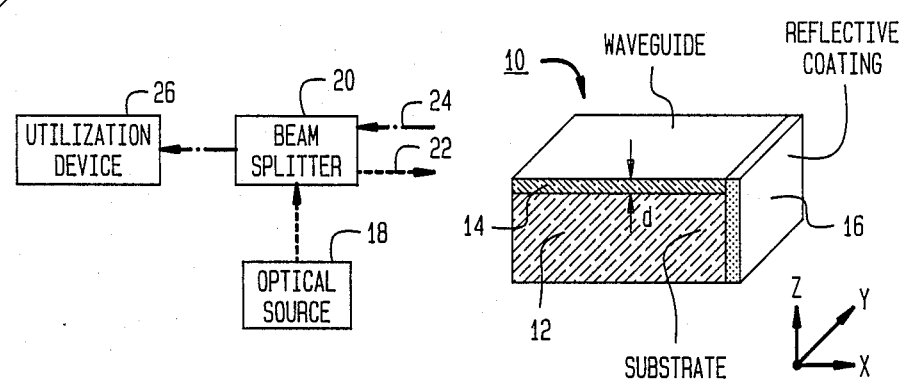
FIG. 1 is a schematic representation of a system that includes a specific illustrative 2D all-optical bistable device made in accordance with the principles of the present invention.

Bistable device 10 shown in FIG. 1 comprises a substrate 12 having a non-linear medium comprising a planar single-mode waveguide 14 formed on or in the top surface of the substrate 12. The waveguide 14 is characterized by an intensitydependent index of refraction that increases with increasing light intensity.

A wide variety of suitable materials and techniques are known for forming the waveguide 14 on or in the top surface of the substrate 12. illustratively, the material of the substrate 12 comprises a glass, a semiconductor (e.g., silicon or gallium arsenide) or one of various other standard materials such as lithium niobate from which conventional integrated-optics devices are made. It is well known, for example, that a planar waveguide can be formed by diffusing titanium into the surface of a lithium niobate substrate. In any case, the waveguide 14 is formed in conventional ways to comprise a thin-film single-mode region whose linear constituent of its overall nonlinear index of refraction is greater than the corresponding constituent of the substrate 12 and of the surrounding medium (typically air).

In FIG. 1, the thickness of the waveguide 14 is designated d. The thin waveguide 14 comprises in effect a 2D waveguiding medium: guided light can propagate only in the X-Y plane.

The device shown in FIG. 1 includes a reflective coating 16 on the right-hand end of the waveguide 14. To facilitate fabrication, it may be convenient to form the reflective coating to also cover the right-hand end of the substrate 12, as shown in FIG. 1. The material of the coating 16 is selected to exhibit high reflectivity at the wavelength of the light intended to be propagated in the waveguide 14.

Light comprising a narrow beam of either low or high intensity is supplied to the FIG. 1 device by a conventional optical source 18 which may comprise, for example, a laser. Illustratively, light is directed into the waveguide 14 from the source 18 via a conventional beam splitter 20. Input light directed at the device 10 is represented by dash-line arrow 22. Optical fibers or other instrumentalities may be interposed between the beam splitter 20 and the waveguide 14 to enhance the coupling of the input light beam into the device 10. In some cases, it may be advantageous to form one or more of the associated components such as the beam splitter 20 as an integral part of the device 10.

Output light that exits from the left-hand end of the waveguide 14 of the FIG. 1 device is represented by dot-dash arrow 24. This light is directed by the beam splitter 20 to a utilization device 26 that represents a standard component (e.g. a photodetector) of an optical signal processing system.

Figure 2A:
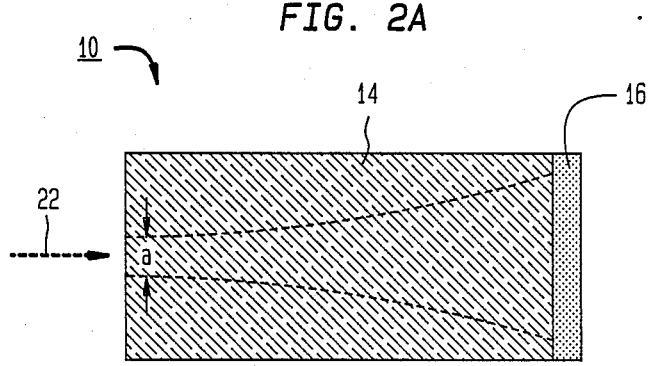
FIG. 2A and 2B each show a top view of the FIG. 1 device and indicate the propagation of a light beam therein under low- and high-intensity conditions, respectively.

The dash-line arrow 22 in FIG. 2A represents a low-intensity input light beam directed at the waveguide 14 of the above-described device 10. The intensity of this beam is assumed to be below the critical intensity at which self-focusing occurs in the waveguide 14. The dash lines within the waveguide 14 of FIG. 2A depict the outline of the beam as it propagates in the nonlinear medium from left to right. Initially, the input light is launched in the waveguide 14 as a parallel beam having a width a. But, as shown, the beam diverges appreciably due to diffraction in the planar waveguide 14 as the beam propagates in the non-linear medium and approaches the reflective coating 16. As a result, relatively little light is reflected back from the coating 16 to appear as a parallel output beam at the left-hand end of the waveguide 14.

Figure 2B:
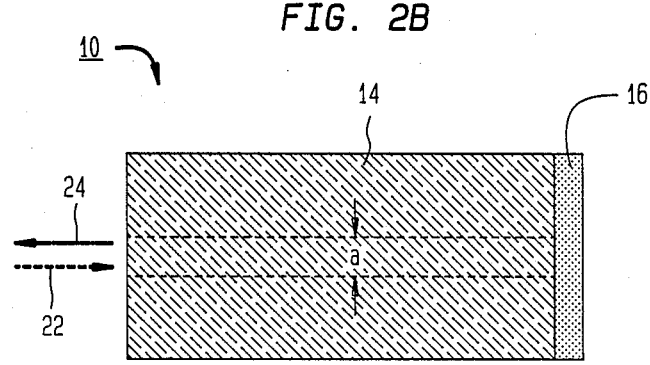

FIG. 2B represents the case in which a high-intensity input light beam, indicated by dash-line arrow 22, is directed at the left-hand end of the waveguide 14. In that case, the light beam is self-focused within the non-linear medium of the waveguide 14. Thus, as indicated by the dash lines within the waveguide 14 of FIG. 2B, the light propagates as a parallel beam having a width a throughout its roundtrip traversal of the waveguide 14. As a result, most of the input light is reflected by the coating 16 to appear as a parallel output beam at the left-hand end of the waveguide 14. In FIG. 2B, this relatively high-intensity output beam from the depicted device is indicated by dot-dash arrow 24.

In the case represented in FIG. 2B, the strongly reflected light beam constitutes feedback that reinforces self-focusing in the non-linear medium of the planar waveguide 14. As a result, self-focusing is maintained in the depicted device even when the intensity of the input light beam is subsequently reduced below the critical intensity. This is the mechanism that gives rise to the advantageous optical bistability or hysteresis characteristic of applicants' unique device.

Figure 3:
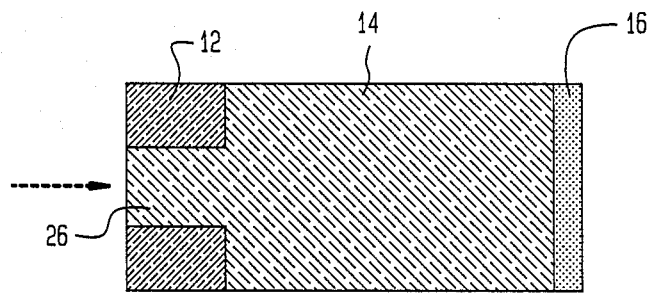
FIG. 3 is a top view of a modified version of the bistable device shown in FIG. 1,2A and 2B.

An advantageous modification of the bistable device shown in FIG. 1, 2A and 2B is depicted in FIG. 3. In the FIG. 3 device, the left-hand portion of the planar waveguide 14 is patterned during fabrication to comprise a narrow single-mode waveguiding section 26 defined on or in the substrate 12. The section 26 is effective to enhance the coupling of input optical signals into the illustrated device.

Figure 4:
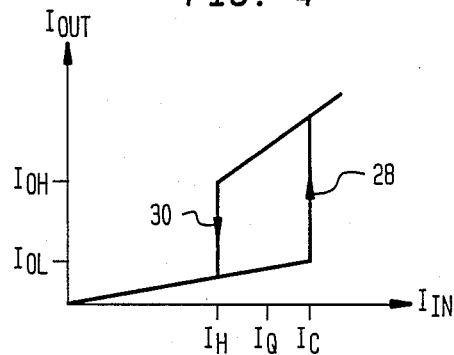
FIG. 4 is a graphical depiction of the hysteresis characteristic exhibited by our bistable device.

An idealized representation of the hysteresis characteristic of the bistable devices shown in FIG. 1, 2A, 2B and 3 is depicted in FIG. 4. In FIG. 4, $I_{IN}$ and $I_{OUT}$ designate the respective intensities of the input and output light beams directed at and received from applicants' above-described devices. As is well known, a device exhibiting a characteristic of the type represented in FIG. 4 is useful for performing switching, logic and memory functions in an information processing system.

FIG. 4 indicates that as the intensity of the input light beam increases from zero towards a critical value $I_C$, the intensity of the output light beam increases from zero towards a relatively low level designated $I_{OL}$. Once $I_C$ is reached or exceeded, the device exhibits self-focusing, as described earlier above. The intensity of the output beam then abruptly increases, as indicated by arrowhead 28, to a relatively high level that equals or exceeds the value designated $I_{OH}$.

Once the self-focusing device represented in FIG. 4 has been switched to its relatively high-output-intensity state, the device will remain in the high state for values of $I_{IN}$ that are less than $I_C$ but greater than a minimum holding intensity designated $I_H$. The device will switch back to its low-output-intensity state only when the input intensity is reduced below the value $I_H$. When that occurs, as indicated by arrowhead 30, the device abruptly switches to provide an output intensity having a value equal to or less than $I_{OL}$.

In one illustrative mode of operation of the herein-described bistable devices, the input light beam has a quiescent value $I_Q$ (FIG. 4). In that case, the intensity of the output beam is equal to or less than $I_{OL}$ (which can, for example, be considered to represent a binary O). If an input light signal is then superimposed on $I_Q$ to cause a resulting intensity that exceeds $I_C$, switching will occur thereby to provide an output beam whose intensity equals or is greater than $I_{OH}$ (which can, for example, represent a binary 1). When the input light signal is removed, $I_Q$ alone will maintain the device in its high-output or 1 state. Switching back to the O state is accomplished by, for example, reducing the intensity of $I_Q$ to a value below $I_H$.

Figure 5:
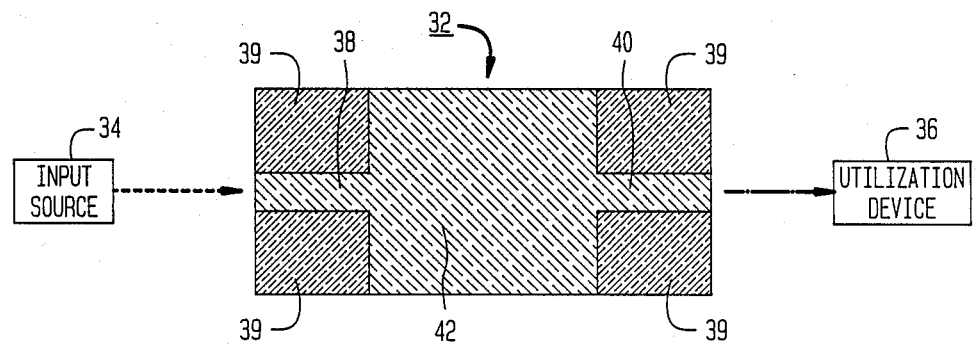
FIG. 5 is a top view of a specific illustrative 2D all-optical switching device made in accordance with the principles of the present invention.

FIG. 5 shows another specific illustrative device 32 made in accordance with our inventive principles. The depicted device functions as a switch. A light beam supplied by input source 34 is weakly or strongly coupled to utilization device 36 depending, respectively, on whether the intensity of the light propagated through a planar waveguide 42 is below or above the value required to achieve selffocusing therein.

Illustratively, the FIG. 5 device includes a narrow input single-mode waveguiding section 38 and a narrow output single-mode waveguiding section 40. Interposed between and integrally formed with the sections 38 and 40 is a single-mode planar waveguiding region 42. As in the priorly described devices, the sections 38 and 40 and the region 42 of FIG. 5 each comprise a thin film made of a nonlinear medium formed on or in the top surface of a substrate 39.

Figure 6A:
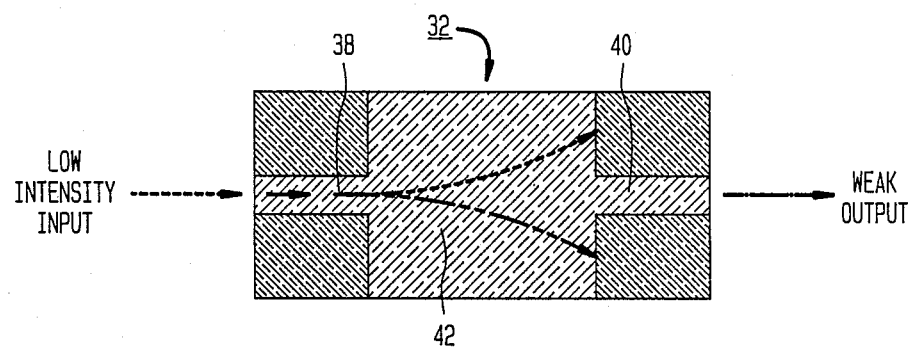
FIG. 6A and 6B indicate the propagation of light through the FIG. 5 device under low- and high-intensity conditions, respectively.

FIG. 6A schematically illustrates the manner in which a lowintensity input light beam propagates through the switching device 32 described above in connection with FIG. 5. As indicated by dash lines, the input beam is not self-focused in the region 42. As a result, the beam diverges considerably in the region 42 and only a relatively small portion or the input beam is coupled to the output section 40 to appear at the output of the device 32. A weak (or 0) output signal is thereby provided by the depicted device.

Figure 6B:
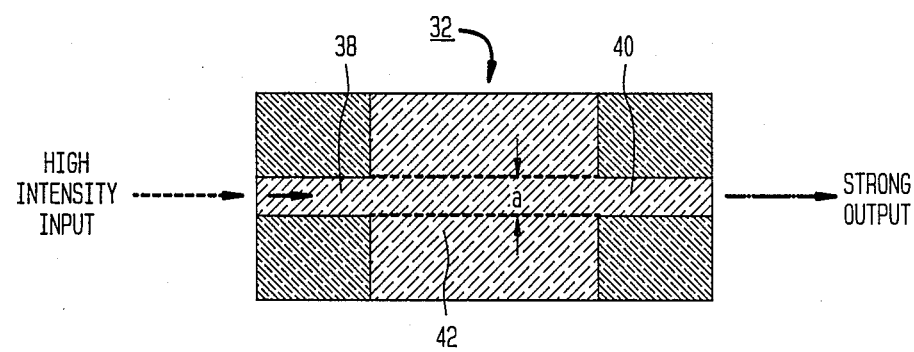

FIG. 6B shows the way in which a high-intensity input light beam propagates through the device 32. As indicated by dash lines, the propagating beam is self-focused within the region 42. Consequently, most of the input beam is directed through the output section 40 of the device 32 to appear at the output thereof. A strong (or 1) output signal is thereby provided by the device.

In one illustrative mode of operation of the switching device 32, a low-intensity input light signal of a specified frequency or polarization is controlled by an input beam to be self-focused or not in the device 32. By way of example, the lowintensity signal by itself is selected to be below the critical value needed for self-focusing to occur. Hence, in that case, the input light signal is only weakly coupled to the utilization device 36 (FIG. 5). But when the intensity of the control beam is added to that of the low-intensity input signal, self-focusing in the device is designed to occur. In that case, the input signal is strongly coupled to the utilization device 36. And, by selecting the control beam to be of a different frequency or polarization than that of the input signal, the input signal can be easily separated from the control beam in the utilization device 36.

In the devices described herein, the critical power, $P_c$, required for achieving self-focusing in a 2D structure is defined by the following relationship:

$$P_c = \frac{c\lambda^2 d}{4\pi^3 n_2 a}$$

In this relationship, c is the velocity of light, $\lambda$ is the wavelength of the input light beam, d is the thickness in the Z direction (FIG. 1) of the thin-film planar waveguide, a is the width of the self-focused beam in the X-Y plane of the waveguide and $n_2$ is the coefficient of the non-linear constituent of the index of refraction of the waveguide.

Finally, it is to be understood that the above-described structures are only illustrative of the principles of the present invention. In accordance with these principles, numerous modifications and alternatives may be devised by those skilled in the art without departing from the spirit and scope of the invention.

What is claimed is:

1. A two-dimensional self-focused optical device having a hysteresis characteristic and comprising:
   means defining a planar non-linear single-mode waveguide;
   reflective means at one end of said waveguide defining means; and
   means for introducing an input light beam at an opposite end of said waveguide defining means, whereby there is no self-focusing in the device for an input beam less than a critical hysteretic value but there is self-focusing for an input light beam above above critical hysteretic value and for as long as the input light beam remains above a minimum holding value.

2. A two-dimensional self-focused optical device in accordance with claim 1 further comprising means for receiving an output light beam from said opposite end of said waveguide defining means after reflection from said one end.

3. A device as in claim 1 further including a narrow single-mode waveguide formed on or in said waveguide defining means at said opposite end of said waveguide defining means and integral with said waveguide defining means to enhance the coupling of input light beams into said waveguide defining means.

* * * * *

UNITED STATES PATENT AND TRADEMARK OFFICE
CERTIFICATE OF CORRECTION

PATENT NO. : 4,856,860

DATED : August 15, 1989

INVENTOR(S) : Yaron Silberberg and Peter W. Smith

It is certified that error appears in the above-identified patent and that said Letters Patent is hereby corrected as shown below:

Column 2, line 63, "intensitydependent" should read --intensity-dependent--;
          line 67, "illustratively" should read --Illustratively--.
Column 5, line 15, "lowintensity" should read --low-intensity--;
          line 20, "portion or" should read --portion of--;
          line 36, "lowintensity" should read --low-intensity--.
Column 6, line 33, "above above critical" should read --above said critical--.

Signed and Sealed this

Seventh Day of July, 1992

Attest:

DOUGLAS B. COMER

*Attesting Officer*      *Acting Commissioner of Patents and Trademarks*